United States Patent
Yamada (10) Patent No.: US 9,870,101 B2
(45) Date of Patent: Jan. 16, 2018

(54) OPERATING DEVICE FOR VEHICLE HAVING A SCREEN WITH AN OPERATING SURFACE AND A PROJECTING UNIT CONFIGURED TO PROJECT AN IMAGE ON THE SCREEN

(71) Applicant: TOYOTA JIDOSHA KABUSHIKI KAISHA, Toyota-shi, Aichi-ken (JP)

(72) Inventor: Yoshinori Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 14/816,837

(22) Filed: Aug. 3, 2015

(65) Prior Publication Data
US 2016/0054842 A1    Feb. 25, 2016

(30) Foreign Application Priority Data
Aug. 22, 2014 (JP) ................... 2014-169520

(51) Int. Cl.
*G06F 3/042* (2006.01)
*G06F 3/041* (2006.01)
(Continued)

(52) U.S. Cl.
CPC ....... *G06F 3/0425* (2013.01); *G01C 21/3664* (2013.01); *G06F 3/0304* (2013.01);
(Continued)

(58) Field of Classification Search
CPC ...... G06F 3/041; G06F 3/0414; G06F 3/0416; G06F 3/042; G06F 3/0425; G06F 3/0426;
(Continued)

(56) References Cited

U.S. PATENT DOCUMENTS 7,084,859 B1 * 8/2006 Pryor .................... G06F 3/0488
345/156
RE45,176 E * 10/2014 Adelson ................ G06F 3/0425
348/61
(Continued)

FOREIGN PATENT DOCUMENTS

CN     103052937 A    4/2013
CN     103631448 A    3/2014
(Continued)

*Primary Examiner* — Nathan Danielsen
(74) *Attorney, Agent, or Firm* — Oliff PLC (57) ABSTRACT

An operating device for a vehicle includes a screen having an operating surface, the screen being configured such that a region of the screen including a portion of the screen to which an operating force is applied is deformed in a direction in which the operating force is applied, in accordance with the operating force applied to the operating surface; a projecting unit configured to project an image onto the screen; a detecting unit configured to detect, as an operating position, the portion of the screen to which the operating force is applied and which is deformed due to the applied operating force; and a processing unit configured to perform predetermined processing associated with a portion of the image projected onto the screen, based on a result of detection performed by the detecting unit, the portion of the image corresponding to the operating position.

7 Claims, 9 Drawing Sheets

(51) Int. Cl.
*G06F 3/0488* (2013.01)
*G06F 3/03* (2006.01)
*G09G 3/00* (2006.01)
*G01C 21/36* (2006.01)

(52) U.S. Cl.
CPC .............. *G06F 3/041* (2013.01); *G06F 3/042* (2013.01); *G06F 3/0414* (2013.01); *G06F 3/0488* (2013.01); *G09G 3/002* (2013.01); *B60K 2350/00* (2013.01); *B60K 2350/1024* (2013.01); *B60K 2350/1028* (2013.01); *G06F 2203/04102* (2013.01); *G09G 2354/00* (2013.01)

(58) Field of Classification Search
CPC .............. G06F 3/0481; G06F 3/04817; G06F 3/0484–3/04847; G06F 3/0487; G06F 3/0488; G06F 2203/04102; G06F 2203/04105; G09G 3/001–3/003; G09G 2354/00; G01C 21/36; G01C 21/3664; B60K 2350/10; B60K 2350/1008; B60K 2350/1024–2350/104
See application file for complete search history.

(56) References Cited

U.S. PATENT DOCUMENTS

| | | | |
|---|---|---|---|
| 2009/0100767 A1* | 4/2009 | Kondo | G03B 21/10 52/6 |
| 2009/0167682 A1* | 7/2009 | Yamashita | G06F 3/0425 345/158 |
| 2009/0300531 A1 | 12/2009 | Pryor | |
| 2010/0141897 A1 | 6/2010 | Kawano et al. | |
| 2012/0032979 A1* | 2/2012 | Blow | G06F 3/0488 345/647 |
| 2013/0179811 A1 | 7/2013 | Nagara et al. | |
| 2014/0055414 A1 | 2/2014 | Kim | |
| 2015/0009218 A1* | 1/2015 | Fukutomi | G09G 3/003 345/428 |

FOREIGN PATENT DOCUMENTS

| | | |
|---|---|---|
| JP | 2003-005617 A | 1/2003 |
| JP | 2006-033357 A | 2/2006 |
| JP | 2007-223416 A | 9/2007 |
| JP | 2009-043157 | 2/2009 |
| JP | 2013-016114 A | 1/2013 |
| JP | 2013-140597 A | 7/2013 |
| TW | 201403584 A | 1/2014 |

\* cited by examiner

PUSH

FIG. 9

OPERATING DEVICE FOR VEHICLE HAVING A SCREEN WITH AN OPERATING SURFACE AND A PROJECTING UNIT CONFIGURED TO PROJECT AN IMAGE ON THE SCREEN

INCORPORATION BY REFERENCE

The disclosure of Japanese Patent Application No. 2014-169520 filed on Aug. 22, 2014 including the specification, drawings and abstract is incorporated herein by reference in its entirety.

BACKGROUND OF THE INVENTION

1. Field of the Invention

The invention relates to an operating device for a vehicle.

2. Description of Related Art

As an example of an operating device for a vehicle, a touch panel, which is used for an input operation in a navigation device or the like, is known.

For example, in Japanese Patent Application Publication No. 2013-016114 (JP 2013-016114A), it is determined whether a variation amount that is an amount of movement per unit time in a touch location is equal to or smaller than a predetermined value, and when the variation amount is larger than the predetermined value, a touch operation is not accepted. Thus, an erroneous determination due to a plurality of operations performed at the same time is prevented.

The touch panel is used also in a mobile phone such as a smartphone. As an input operation for the touch panel, a tracing operation (a so-called flick operation) is generally known.

However, since the touch panel used in JP 2013-016114A or the mobile terminal, such as the smartphone, has an operating surface formed of a hard material, that is, a material that does not feel soft, the touch panel gives a "cold impression". Therefore, the touch panel does not provide a pleasant feeling or a comfortable feeling to the user.

SUMMARY OF THE INVENTION

The invention provides an operating device for a vehicle, which makes a user have a pleasant feeling when the user touches the operating device, and which allows the user to enjoy operating the operating device.

An operating device for a vehicle according to an aspect of the invention includes a screen having an operating surface, the screen being configured such that a region of the screen including a portion of the screen to which an operating force is applied is deformed in a direction in which the operating force is applied, in accordance with the operating force applied to the operating surface; a projecting unit configured to project an image onto the screen; a detecting unit configured to detect, as an operating position, the portion of the screen to which the operating force is applied and which is deformed due to the applied operating force; and a processing unit configured to perform predetermined processing associated with a portion of the image projected onto the screen, based on a result of detection performed by the detecting unit, the portion of the image corresponding to the operating position.

In the above-described aspect of the invention, the screen has the operating surface, and is configured such that the region of the screen including the portion of the screen to which the operating force is applied is deformed in the direction in which the operating force is applied, in accordance with the operating force applied to the operating surface. That is, the screen is three-dimensionally deformable. For example, the screen may be formed of a material that feels soft, and is elastic, such as a cloth, rubber, or a film.

The projecting unit is configured to project the image onto the screen, and the detecting unit is configured to detect, as the operating position, the portion of the screen to which the operating force is applied and which is deformed due to the applied operating force, that is, the portion of the screen that is three-dimensionally deformed by an operation performed on the screen.

Based on the result of detection performed by the detecting unit, the processing unit performs the predetermined processing associated with the portion of the image projected onto the screen, the portion of the image corresponding to the operating position. In other words, it is possible to perform the predetermined processing, for example, processing for providing an instruction to perform an operation corresponding to the operating position, or processing for switching between projected images.

Since the three-dimensionally deformable screen is used, the user can obtain a feeling (sensation) different from a feeling obtained when the user touches a conventional hard touch panel that is not three-dimensionally deformed. Thus, the user can obtain a pleasant feeling when the user touches the screen, and can enjoy operating the screen. Further, since the user can operate the screen such that the screen is three-dimensionally recessed (depressed), the user can enjoy the operation that cannot be performed on the conventional touch panel.

The projecting unit may be configured to project the image onto the screen from a side opposite to the operating surface of the screen. With this configuration, the image is not obstructed or hidden by (the shade of) the hand of the user. Accordingly, the user can operate the screen while seeing the image.

The processing unit may be configured to further perform image processing such that a plurality of images around the portion of the screen, to which the operating force is applied and which is deformed due to the applied operating force, move to the portion of the screen. With this configuration, the plurality of images around the portion of the screen, which is three-dimensionally recessed (depressed) due to the operation performed on the screen, are absorbed (sucked) into the portion of the screen. That is, the image (visual representation), in which the plurality of images are absorbed into the portion of the screen, is projected. In other words, the plurality of images are absorbed into the recessed portion that is formed by recessing the surface of the screen. Thus, the user can enjoy the operation and the display (visual representation) that provide a pleasant sensation and a pleasant feeling to the user.

The projecting unit may be configured to project the image toward a ceiling of the vehicle; and the screen may be movable to a projecting position and to a non-projecting position such that when the screen is located at the projecting position, the image is projected onto the screen, and when the screen is located at the non-projecting position, the image is not projected onto the screen.

As described above, according to the above-described aspect of the invention, it is possible to provide the operating device for a vehicle, which provides a pleasant feeling when the user touches the operating device, and which allows the user to enjoy operating the operating device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
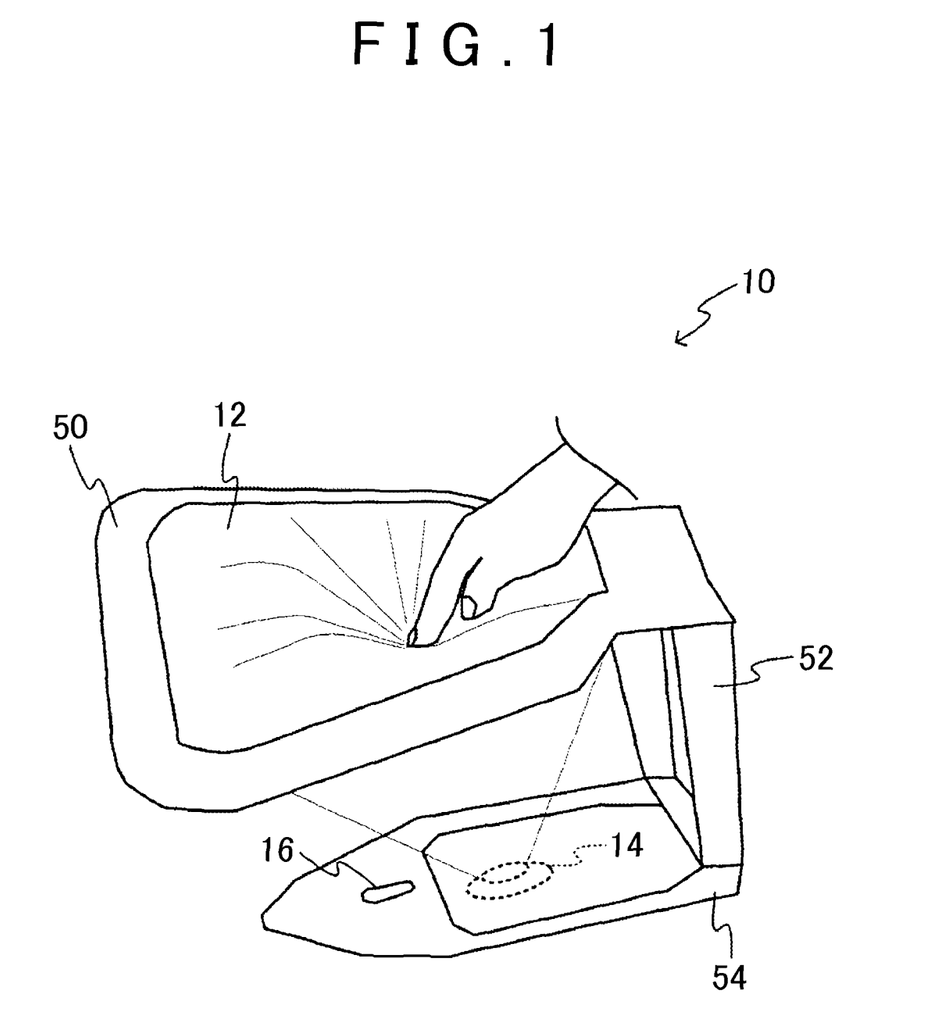
FIG. 1 is a schematic perspective view showing an operating device for a vehicle according to an embodiment of the invention.
Figure 2:
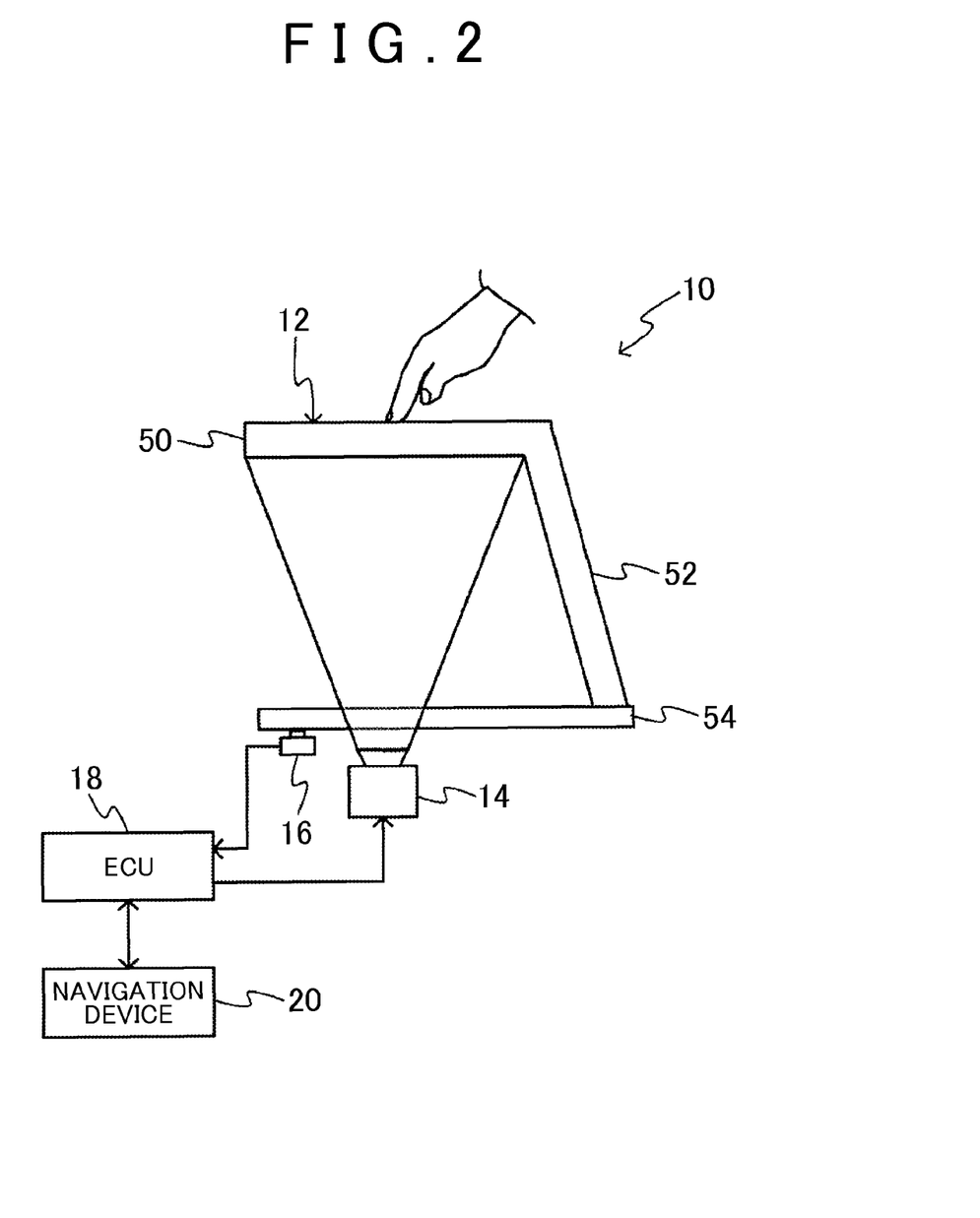
FIG. 2 is a block diagram showing a schematic configuration of the operating device for a vehicle according to the embodiment of the invention.

Hereinafter, an embodiment of the invention will be described in detail with reference to the drawings. FIG. 1 is a schematic perspective view showing an operating device for a vehicle according to the embodiment of the invention. FIG. 2 is a block diagram showing a schematic configuration of the operating device for a vehicle according to the embodiment of the invention.

As shown in FIG. 1, an operating device for a vehicle (hereinafter, simply referred to as "operating device") 10 according to the embodiment includes a screen 12 that displays various images. The screen 12 has an operating surface, and is configured such that a region of the screen 12 including a portion of the screen 12 to which the operating force is applied is deformed in a direction in which the operating force is applied, in accordance with the operating force applied to the operating surface. The screen 12 is formed of a material that feels soft (flexible) and is elastic (stretchable). The tracing operation (i.e., the flick operation) can be performed on the screen 12, as in the case of the touch panel. The screen 12 is formed of a material that feels soft and is elastic, such as a cloth (fabric), thin semi-transmissive (translucent) rubber, or a thin semi-transmissive (translucent) film. In the embodiment, by using the screen 12 formed of a material that feels soft and is elastic, a user can three-dimensionally deform the operating surface, in other words, the user can perform an operation that three-dimensionally deforms the operating surface (for example, a pushing operation that three-dimensionally pushes the operating surface, and a pushing-tracing (pushing-flick) operation that traces (flicks) the operating surface while three-dimensionally pushing the operating surface). In the conventional touch panel formed of a hard material, it is not possible to perform the operation that three-dimensionally deforms the operating surface. In the embodiment, an image is projected from a side opposite to the operating surface. Therefore, the screen 12 formed of a transmissive (transparent) or semi-transmissive (translucent) material is used.

The screen 12 is fixed by a frame member 50, and the frame member 50 is supported by a support member 52. The support member 52 is supported by a base 54 that is provided in, for example, a center console of a vehicle.

The operating surface of the screen 12 is located on an upper side in FIG. 1 and FIG. 2 (for example, on the upper side in a vehicle-height direction). An image projecting unit 14 configured to project an image onto the screen 12, such as a projector, and a position detecting unit 16 (a first position detecting unit) configured to detect the touch operation performed on the screen 12 are provided on an opposite side (i.e., on a side opposite to the operating surface, for example, on a lower side in the vehicle-height direction). In other words, the image projecting unit 14 and the position detecting unit 16 are provided in an area on the side of the screen 12, the side being opposite to the operating surface of the screen 12. The image projecting unit 14 and the position detecting unit 16 are provided in, for example, in the center console portion of the vehicle.

The position detecting unit 16 detects information used to detect, as an operating position, a portion of the screen 12, to which the operating force is applied, and which is three-dimensionally deformed by the operating force. As the position detecting unit 16, for example, an infrared camera or an infrared distance sensor may be used to detect information used to identify a portion that is three-dimensionally pushed by the operation performed on the screen (for example, infrared image information or distance information). Alternatively, the position detecting unit 16 may be provided in the screen 12 to detect the deformation of the screen 12. In this case, for example, an elastic sensor that is able to detect a change in a surface area may be used.

As shown in FIG. 2, the image projecting unit 14 and the position detecting unit 16 are connected to an Electronic Control Unit (ECU) 18. For example, the ECU 18 includes a microcomputer including a Central Processing Unit (CPU), a Read Only Memory (ROM), a Random Access Memory (RAM), and input/output ports. The CPU, the ROM, the RAM, and the input/output ports are connected to a bus.

The ECU 18 performs predetermined processing associated with the operating position in the image projected onto the screen 12, based on a result of detection performed by the position detecting unit 16. More specifically, the ECU 18 controls the image projecting unit 14 to perform a control for displaying an image on the screen 12. In addition, the ECU 18 detects the operating position in the screen 12, based on the result of detection performed by the position detecting unit 16, and performs processing corresponding to (associated with) the detected position (for example, performs a control for providing an operation instruction or switching between images).

As shown in FIG. 2, the ECU 18 may be connected to a navigation device 20. For example, the ECU 18 may be connected to the navigation device 20 to perform an input operation, for example, an operation of setting a destination. The ECU 18 may be connected to an audio-visual device, an air conditioning device, and the like to operate the devices, in addition to the navigation device 20.

Figure 3:
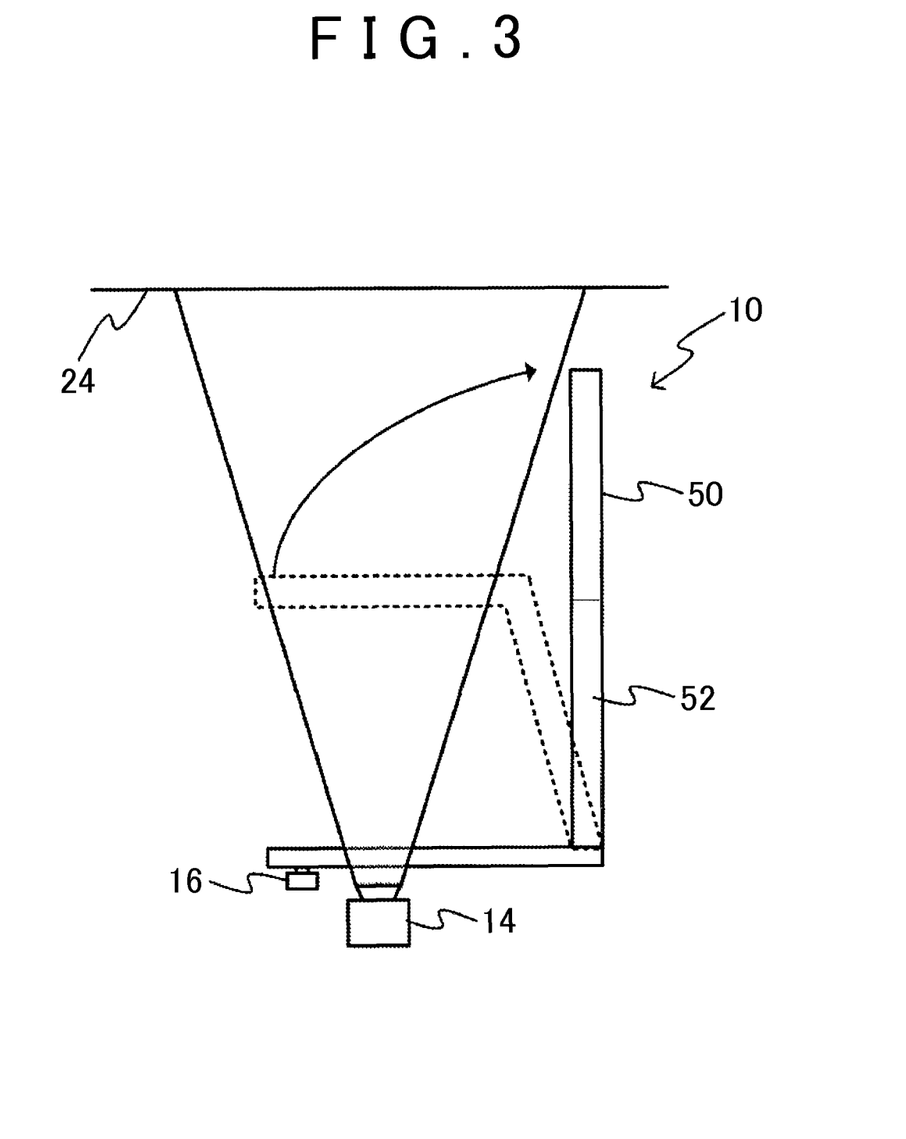
FIG. 3 is a schematic view showing a screen in a standing state.

In the embodiment, the frame member 50, to which the screen 12 is fixed, is rotatable with respect to the support member 52. The support member 52 is rotatable with respect to the base 54. That is, the screen 12 is movable to a projecting position and to a non-projecting position. When the screen 12 is located at the projecting position, the image is projected onto the screen 12, and when the screen 12 is located at the non-projecting position, the image is not projected onto the screen 12. In the embodiment, when the screen 12 is moved to the non-projecting position, the frame member 50 and the support member 52 are moved from a position indicated by a dotted line, to a position indicated by a solid line, that is, the frame member 50 and the support member 52 are brought to a standing state, as shown in FIG. 3. Thus, the image can be projected onto a ceiling 24, instead of being projected onto the screen 12, as shown in FIG. 3.

Figure 4:
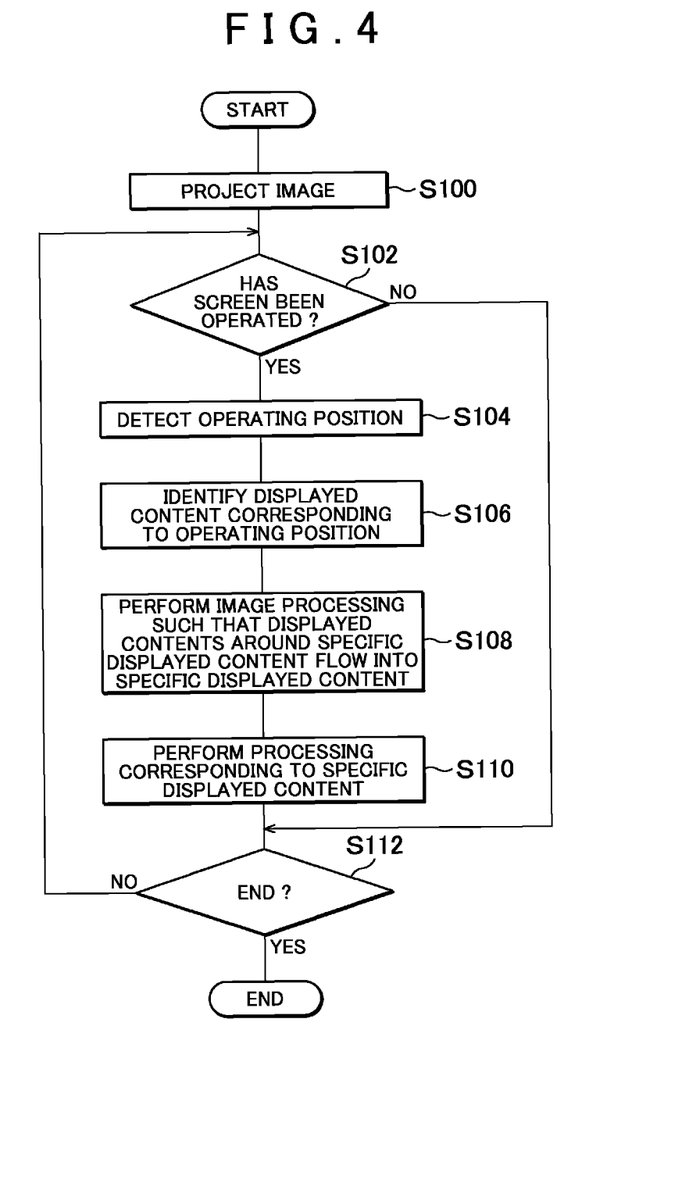
FIG. 4 is a flowchart showing an example of a flow of a process performed by an ECU of the operating device for a vehicle according to the embodiment of the invention.

Next, examples of specific processing performed by the ECU 18 in the operating device 10 with the above-described configuration according to the embodiment will be described. FIG. 4 is a flowchart showing an example of a flow of a process performed by the ECU 18 in the operating device 10 according to the embodiment of the invention. The processing shown in FIG. 4 is started, for example, when an ignition switch is turned on, or when a power supply for the operating device 10 is turned on.

In step 100, the ECU 18 controls the image projecting unit 14 to project an image onto the screen 12. Then, the process proceeds to step 102. At this time, in the embodiment, the image is projected from the side opposite to the operating surface of the screen 12. Therefore, the projected image is not obstructed or hidden by (the shadow of) a hand of a user when the user performs an operation on the screen 12 (i.e., when the user operates the screen 12). The user can perform the operation on the screen 12 while seeing the image as in the case of the touch panel of a mobile terminal such as a smartphone. Various images can be projected onto the screen 12. For example, a predetermined menu image may be displayed. A navigation image, a destination setting screen that is a screen used to set a destination, and the like may be displayed.

In step 102, the ECU 18 determines whether an operation has been performed on the screen 12 (i.e., whether the screen 12 has been operated). The ECU 18 obtains a result of detection performed by the position detecting unit 16, and performs the determination based on the result of detection. In a case where a camera, such as an infrared camera, is used as the position detecting unit 16, the ECU 18 determines whether the screen 12 has been three-dimensionally changed, based on the captured image. In a case where a distance sensor, such as an infrared distance sensor, is used, the ECU 18 determines whether a distance between the distance sensor and the screen 12 has been changed. When an affirmative determination is made, the process proceeds to step 104. When a negative determination is made, the process proceeds to step 112.

In step 104, the ECU 18 detects the operating position based on the result of detection performed by the position detecting unit 16. Then, the process proceeds to step 106. The ECU 18 detects the operating position by identifying a portion that is three-dimensionally pushed, based on the captured image or the detected distance (the result of distance detection). Since the operating position is detected by identifying the portion (the recessed portion) that is three-dimensionally pushed using the camera or the distance sensor, the accuracy with which the operating position is detected can be increased. That is, it is possible to more reliably detect the user's intention, as compared to the case where the conventional touch panel is used.

In step 106, the ECU 18 identifies a displayed content corresponding to the determined operating position. Then, the process proceeds to step 108. The ECU 18 identifies the displayed content corresponding to the operating position, for example, by matching the position of the displayed content in the image that is currently displayed, with the determined operating position.

Figure 5A:
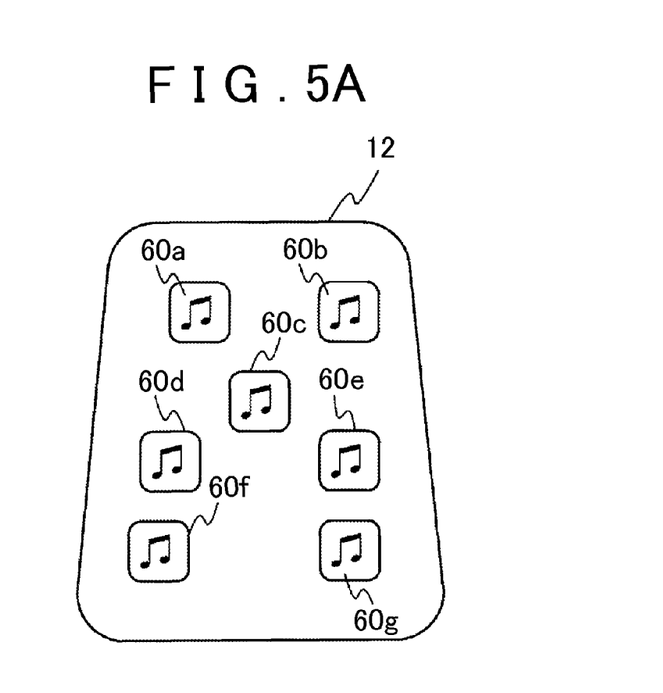
FIG. 5A is a view showing an example in which a plurality of displayed contents of notes are projected onto the screen.
Figure 5B:
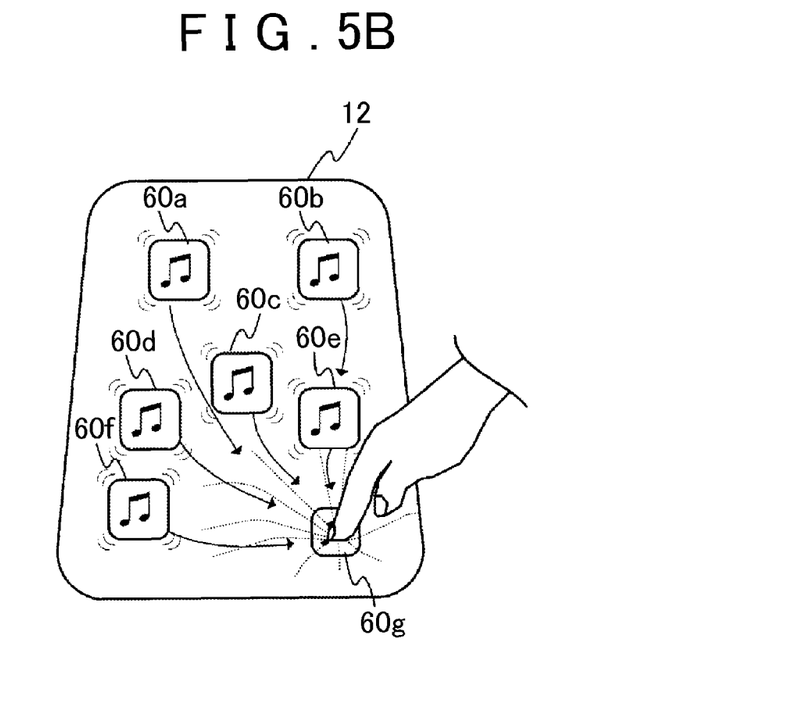
FIG. 5B is a view showing a display in which the displayed contents around a displayed content corresponding to an operating position flow into the displayed content corresponding to the operating position.

In step 108, the ECU 18 performs image processing to generate an image in which displayed contents around the identified displayed content flow into the identified displayed content, and projects the generated image onto the screen 12 using the image projecting unit 14. Then, the process proceeds to step 110. Hereinafter, an example where a plurality of displayed contents of notes 60*a* to 60*g* are projected onto the screen 12 as shown in FIG. 5A will be described. As shown in FIG. 5B, when the user three-dimensionally pushes the screen 12 to operate the screen 12, the ECU 18 performs the image processing such that the displayed contents around a recessed portion (depressed portion) of the screen 12, which is deformed by the operating force, move to the recessed portion. That is, the image processing is performed to generate the image in which the displayed contents 60*a* to 60*f* around the displayed content 60*g*, which corresponds to the operating position, move toward the displayed content 60*g*, and the image is projected. The screen 12 is three-dimensionally pushed, and the displayed contents around the displayed content corresponding to the operating position are moved toward the displayed content corresponding to the operating position. Thus, the image in which the displayed contents flow into the displayed content corresponding to the operating position is displayed. In other words, it is possible to express movement of the displayed contents, that is, it is possible to express a situation where the displayed contents are gathered at the portion that is pushed and recessed (depressed), and are absorbed (sucked) into the recessed portion (depressed portion). Thus, the user can enjoy the operation and the display (visual representation) in which the displayed contents are absorbed into the recessed portion formed by recessing the surface. That is, the user can enjoy the operation and the display (visual representation) that provide a pleasant sensation and a pleasant feeling to the user. In other words, in the operating device 10 according to the embodiment, the user can perform the operation that cannot be performed on the conventional touch panel. Further, the operating device 10 according to the embodiment can provide the display (visual representation) that cannot be provided by the conventional touch panel. Thus, it is possible to increase the kinds of operations that can be performed, and to increase the kinds of visual representations that can be provided.

In step 110, the ECU 18 performs processing corresponding to the identified displayed content, and then, the process proceeds to step 112. For example, the ECU 18 provides an operation instruction to a device corresponding to the identified displayed content, and/or controls the image projecting unit 14 so as to project an image corresponding to the identified displayed content, onto the screen 12. More specifically, in a case where the identified displayed content indicates that a map screen should be displayed, the ECU 18 obtains a map image from the navigation device, and controls the image projecting unit 14 so as to project the map image onto the screen 12.

In step 112, the ECU 18 determines whether the operation has been ended. The ECU 18 determines whether the operation has been ended, for example, by determining whether the ignition switch or the power supply switch (not shown) of the operating device 10 has been operated and turned off. When a negative determination is made, the process returns to step 102, and the above-described process is repeated. When an affirmative determination is made, the projection of the image using the image projecting unit 14 is ended, and the process is ended.

As described above, in the operating device 10 according to the embodiment, a screen that feels soft is used as the screen 12 corresponding to the touch panel display, and therefore, the occupant (user) can obtain a feeling (feel) different from that obtained when the occupant touches the conventional hard touch panel. Further the occupant has a pleasant feeling when touching the screen 12, and can enjoy operating the screen 12. Further, the occupant can enjoy operating the screen 12 while three-dimensionally pushing (depressing) the screen 12. That is, the occupant can enjoy the operation that cannot be performed on the conventional operating device (conventional touch panel).

Further, since the image projecting unit 14 is provided on the side opposite to the operating surface of the screen 12 (in other words, the image projecting unit 14 is provided in the area on the side of the screen 12, the side being opposite to the operating surface of the screen 12), and the image is projected onto the screen 12 from the side opposite to the operating surface, the image is not obstructed or hidden when the user operates the screen 12. Accordingly, the user can operate the screen 12 while seeing the image.

Subsequently, specific operations of the operating device 10 will be described.

Figure 6:
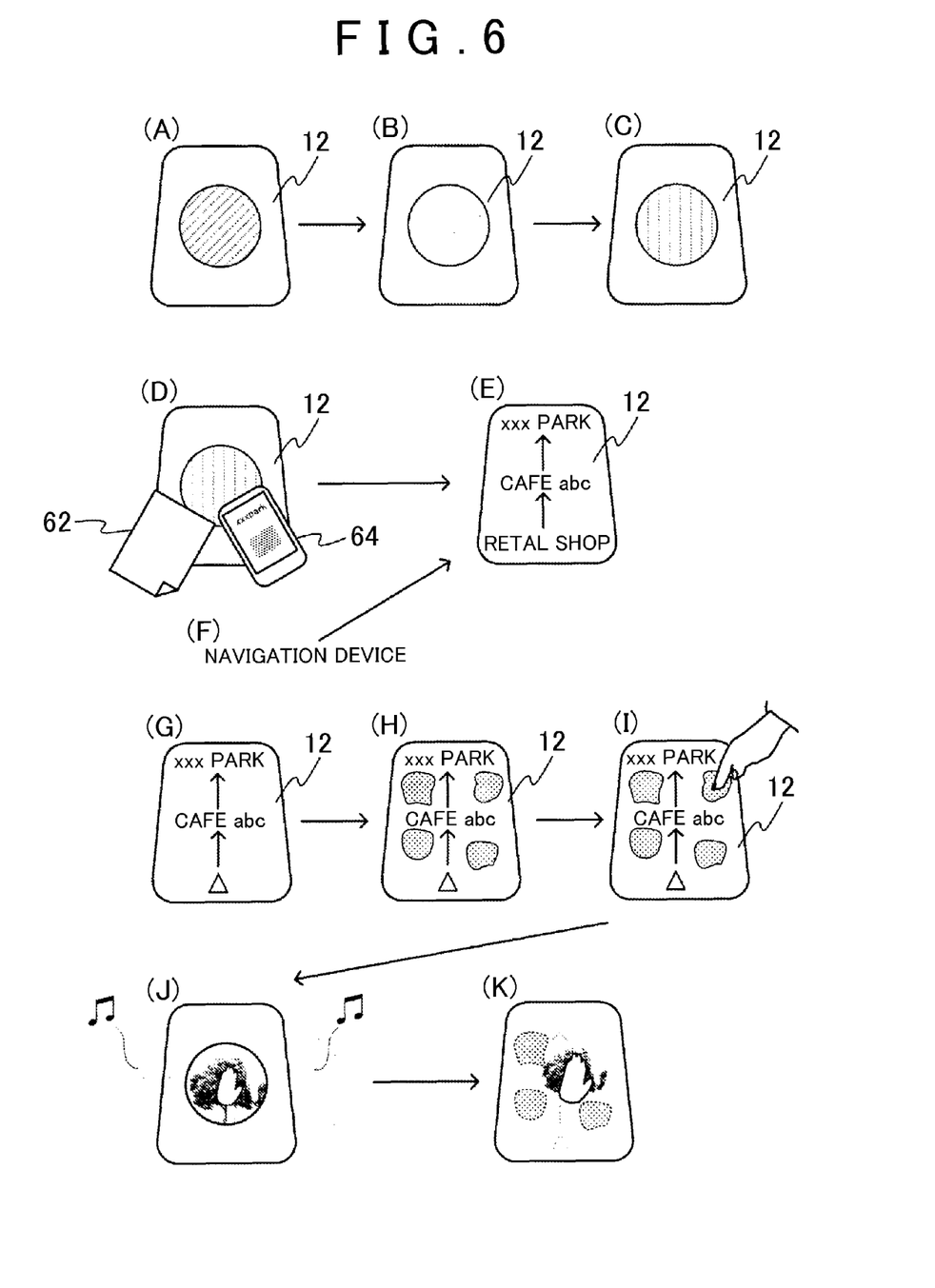
FIG. 6 is a view showing specific examples of operations of the operating device for a vehicle according to the embodiment of the invention.

In a case where, for example, a sensor that detects an occupant getting on a vehicle is provided and is connected to the ECU 18, the ECU 18 can determine the number of occupants in the vehicle. Accordingly, as shown in (A) to (C) in FIG. 6, the color of light projected onto the screen 12 may be changed in accordance with the number of occupants in the vehicle. That is, in this case, the ECU 18 determines the number of occupants in the vehicle, and changes the color of the light projected onto the screen 12 in accordance with the number of occupants in the vehicle. For example, when one person (the first person) gets on the vehicle in a standby state, purple light is projected onto the screen 12 (refer to (A) in FIG. 6). When the second person gets on the vehicle, green light is projected onto the screen 12 (refer to (B) in FIG. 6), and when the third person gets on the vehicle, blue light is projected onto the screen 12 (refer to (C) in FIG. 6).

The operating device 10 may further include a camera that captures the image of the operating surface side of the screen 12, and the ECU 18 may obtain the image captured by the camera, and may set a destination in the navigation device 20. For example, in a case where paper 62 and a mobile terminal 64, such as a smartphone, are placed on the screen 12 as shown in (D) in FIG. 6, the camera captures the image of the paper 62 and the mobile terminal 64. A location described on the paper 62, or a location indicated in the mobile terminal 64 may be determined using a two-dimensional barcode, based on the captured image, and the determined location may be converted to the destination, and the destination may be displayed on the screen 12 as shown in (E) in FIG. 6. Alternatively, the ECU 18 may obtain a route for traveling to the destination set in the navigation device shown in (F) in FIG. 6, and the route may be displayed on the screen 12.

Nearby spots (locations) on the route for traveling to the destination may be searched for (retrieved) and displayed on the screen 12. For example, a route for traveling to a "xxx PARK" via a "CAFE abc" may be set as shown in (G) in FIG. 6. In this case, first, a planned route is displayed on the screen 12 as shown in (G) in FIG. 6. Next, the ECU 18 or the navigation device 20 extracts, for example, nearby spots that are not included in the planed route, and then, the ECU 18 controls the image projecting unit 14 such that the spots are displayed in a blurred manner, as shown in (H) in FIG. 6. When the user is interested in a spot, the user may be able to see information on the spot by pushing the blurred image of the spot as shown in (I) in FIG. 6. For example, when the user pushes the image, the color of a lighting device in the interior of the vehicle may be changed to a color corresponding to the selected image, or ambient sound (music) corresponding to the spot may be generated (played), as shown in (J) in FIG. 6. When the user wants to add the spot to the route, the user may be able to add the spot to the route by, for example, pushing the displayed information again as shown in (K) in FIG. 6.

The lighting device may be turned on, and/or light may be projected onto the screen 12 in synchronization with music in the interior of the vehicle. Alternatively, a landscape outside the vehicle may be recognized using a satellite image of a current location at which the vehicle is currently located, based on information on the current location, or using the camera or the like, and the lighting device may output light with a color corresponding to the landscape outside the vehicle, or light with a color corresponding to the landscape outside the vehicle may be projected onto the screen 12.

Figure 7:
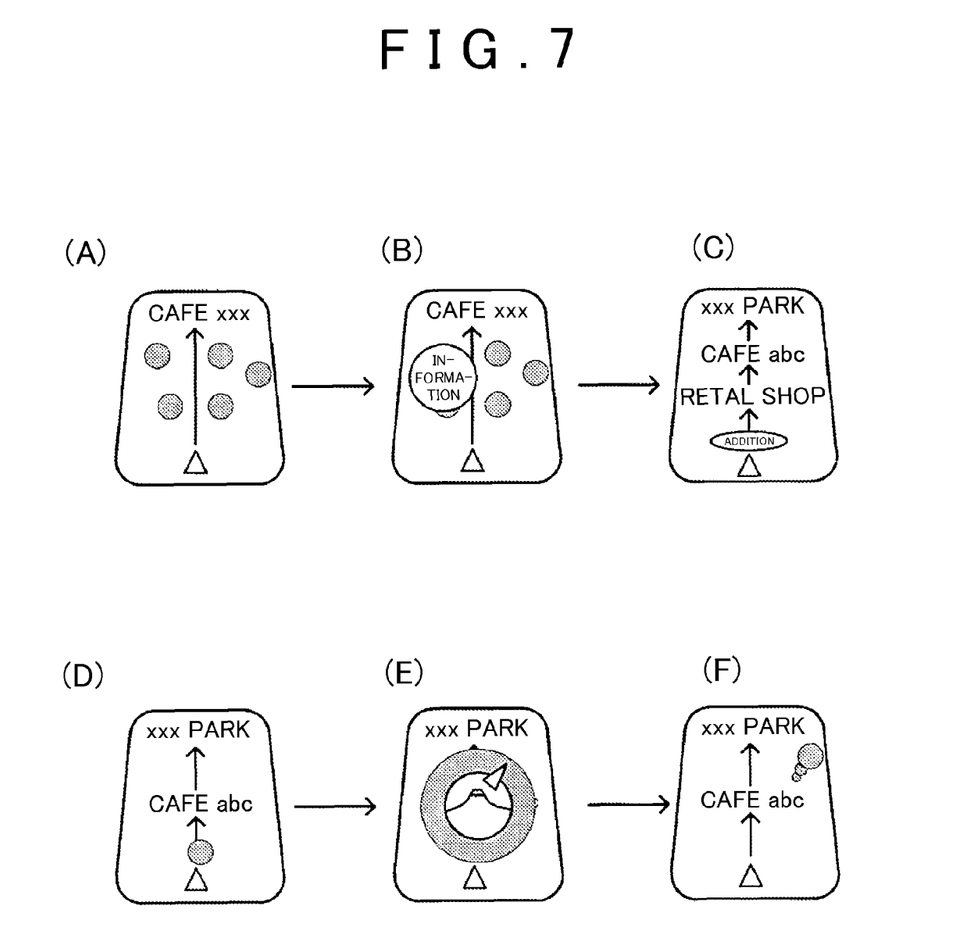
FIG. 7 is a view showing other specific examples of operations of the operating device for a vehicle according to the embodiment of the invention.

The user may be able to perform an operation of adding spots to the route up to the destination. For example, in a case where a route for traveling to the "CAFE abc" is displayed as shown in (A) in FIG. 7, spots on the route up to the "CAFE abc" are displayed as black circles on the screen 12. The spots may be selected from spots, for example, in a category in the navigation device. For example, when restaurants are selected, locations of the restaurants are displayed as the black circles on the screen 12 as shown in (A) in FIG. 7. When the user performs a touch operation on the screen 12 (i.e., when the user touches a black circle on the screen 12), detailed information corresponding to the touched black circle is displayed as shown in (B) in FIG. 7. A spot (location) may be added to the route as shown in (C) in FIG. 7, by performing a predetermined operation, for example, by performing the touch operation again. In the example shown in (C) in FIG. 7, a spot (location) is added before reaching "RENTAL SHOP".

For example, a spot with a beautiful landscape may be displayed on the screen 12 to notify the user of the spot during traveling. For example, a mark indicating a spot with a beautiful landscape on the route is displayed as shown in (D) in FIG. 7. When the user performs the touch operation on the mark (i.e., when the user touches the mark), information on the spot is displayed on the screen 12 as shown in (E) in FIG. 7. The ECU 18 may control the image projecting unit 14 such that the mark disappears as shown in (F) in FIG. 7 when the vehicle passes an area where the user can see the landscape of the spot.

Figure 8:
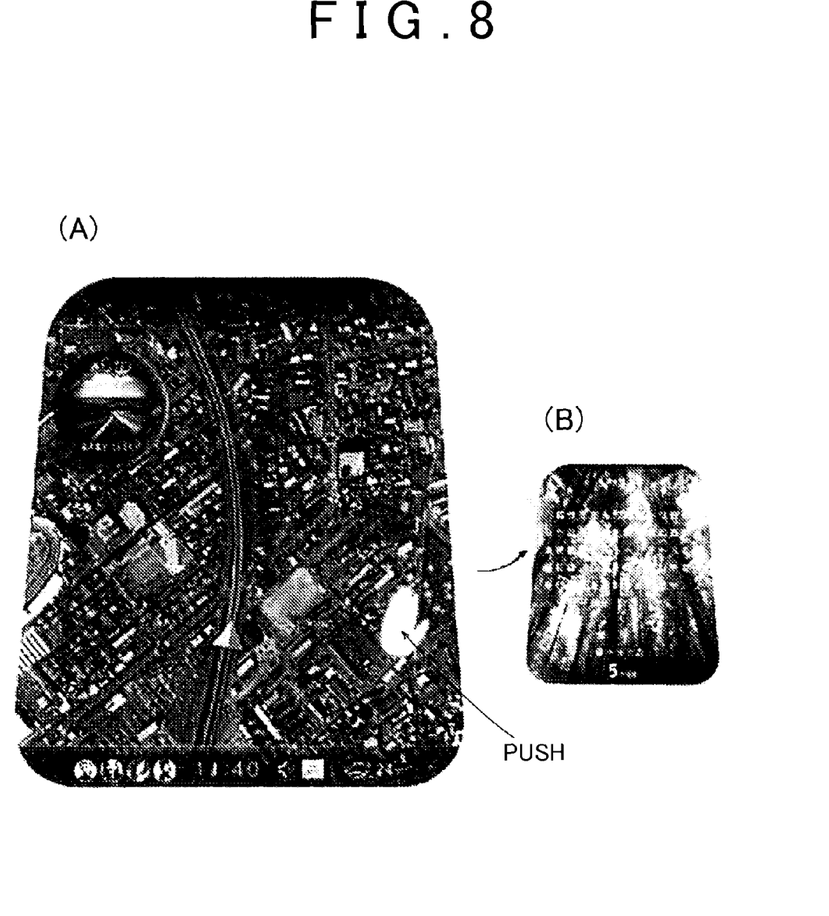
FIG. 8 is a view showing an example in which a bird's eye image based on a photographed map is displayed on the screen, and information on a pushed location is displayed at the pushed location in a manner such that the information enters the pushed location.

In the case where the image projecting unit 14 operates in conjunction with the navigation device 20 as described above, a bird's eye image based on a photographed map may be displayed on the screen 12 as shown in (A) in FIG. 8. When the user is interested in a location, the user may push the location, and then, information on the location may be displayed on the screen 12 in a manner such that the information enters the pushed (depressed) location, as shown in (B) in FIG. 8. At this time, a control may be performed such that the color of light of the lighting device or the color of light projected onto the screen 12 is changed to a color corresponding to the location.

Figure 9:
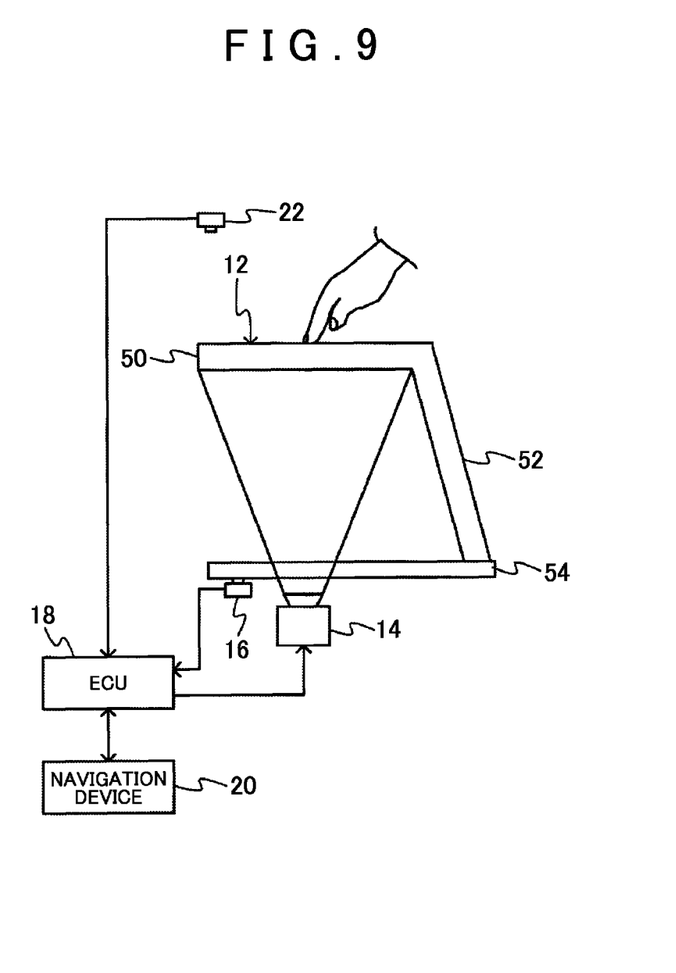
FIG. 9 is a view showing an example in which a position detecting unit is further provided on the side of an operating surface.

In the embodiment, the position detecting unit 16 (first position detecting unit) is disposed on the side opposite to the operating surface of the screen 12 (in other words, the position detecting unit 16 is disposed in the area on the side of the screen 12, the side being opposite to the operating surface of the screen 12), so as to detect information for identifying the operating position. However, the invention is not limited to this configuration. For example, a position detecting unit 22 (second position detecting unit) may be provided on the side of the operating surface of the screen 12 as shown in FIG. 9. By providing the two position detecting units 16, 22 as shown in FIG. 9, it is possible to detect, for example, a multi-touch operation (i.e., it is possible to detect, for example, multiple points of contact). Alternatively, only the position detecting unit 22 on the side of the operating surface of the screen 12 may be provided.

The invention is not limited to the above-described configurations. Various modifications may be made to the above-described configurations, within the scope of the invention. Further, the operating device according to the invention can be employed for various devices (for example, a game machine), in addition to a vehicle.

What is claimed is:

1. An operating device for a vehicle, comprising:
   a stretchable screen having an operating surface, the stretchable screen being configured such that a region of the stretchable screen including a portion of the stretchable screen to which an operating force is applied is three-dimensionally depressed in a direction in which the operating force is applied, in accordance with the operating force applied to the operating surface;
   a projecting unit configured to project an image onto the stretchable screen;
   a detecting unit configured to detect, as an operating position, the portion of the stretchable screen to which the operating force is applied and which is three-dimensionally depressed due to the applied operating force; and
   a processing unit configured to perform predetermined processing associated with a portion of the image projected onto the stretchable screen, based on a result of detection performed by the detecting unit, the portion of the image corresponding to the operating position.

2. The operating device according to claim 1, wherein the projecting unit is configured to project the image onto the stretchable screen from a side of the device opposite to the operating surface of the stretchable screen.

3. The operating device according to claim 1, wherein the processing unit is configured to further perform image processing such that a plurality of images around the portion of the stretchable screen, to which the operating force is applied and which is three-dimensionally depressed due to the applied operating force, move to the portion of the stretchable screen.

4. An operating device for a vehicle, comprising:
   a screen having an operating surface, the screen being configured such that a region of the screen including a portion of the screen to which an operating force is applied is deformed in a direction in which the operating force is applied, in accordance with the operating force applied to the operating surface;
   a projecting unit configured to project an image onto the screen;
   a detecting unit configured to detect, as an operating position, the portion of the screen to which the operating force is applied and which is deformed due to the applied operating force; and
   a processing unit configured to perform predetermined processing associated with a portion of the image projected onto the screen, based on a result of detection performed by the detecting unit, the portion of the image corresponding to the operating position,
   the projecting unit being configured to project the image toward a ceiling of the vehicle; and
   the screen being movable to a projecting position and to a non-projecting position such that when the screen is located at the projecting position, the image is projected onto the screen, and when the screen is located at the non-projecting position, the image is not projected onto the screen.

5. The operating device according to claim 1, wherein the detecting unit is a camera or a distance sensor.

6. The operating device according to claim 1, wherein the detecting unit includes a first position detecting unit provided on a side of the device opposite to the operating surface of the stretchable screen, and a second position detecting unit provided on a screen-operating-surface side of the device.

7. The operating device according to claim 1, wherein the stretchable screen is composed of a material selected from the group consisting of cloth, rubber, and a film.

* * * * *

UNITED STATES PATENT AND TRADEMARK OFFICE
CERTIFICATE OF CORRECTION

PATENT NO. : 9,870,101 B2
APPLICATION NO. : 14/816837
DATED : January 16, 2018
INVENTOR(S) : Yoshinori Yamada It is certified that error appears in the above-identified patent and that said Letters Patent is hereby corrected as shown below:

On the Title Page

Item (54) and in the Specification at Column 1, Line 1-5:
"OPERATING DEVICE FOR VEHICLE HAVING A SCREEN WITH AN OPERATING SURFACE AND A PROJECTING UNIT CONFIGURED TO PROJECT AN IMAGE ON THE SCREEN" should be --- OPERATING DEVICE FOR VEHICLE HAVING A SCREEN WITH AN OPERATING SURFACE AND A PROJECTING UNIT CONFIGURED TO PROJECT AN IMAGE ONTO THE SCREEN ---

Signed and Sealed this
Third Day of April, 2018

Andrei Iancu
*Director of the United States Patent and Trademark Office*